United States Patent [19]

Urban

[11] Patent Number: 4,754,857
[45] Date of Patent: Jul. 5, 1988

[54] UNIVERSAL AIR CHAMBER MOUNTING BRACKET

[75] Inventor: John A. Urban, Plainwell, Mich.

[73] Assignee: Eaton Corporation, Cleveland, Ohio

[21] Appl. No.: 385,733

[22] Filed: Jun. 7, 1982

[51] Int. Cl.⁴ .............................................. F16D 65/14
[52] U.S. Cl. .................................. 188/205 R; 188/209;
    248/274; 248/297.3; 248/558; 403/4; 403/337
[58] Field of Search ............... 188/205 R, 206 R, 209;
    248/274, 287, 297.3, 558; 74/815; 403/3, 4, 337;
    269/69, 70

[56] References Cited

U.S. PATENT DOCUMENTS

| D. 260,758 | 9/1981 | Borugian | D8/356 X |
| 1,705,488 | 3/1929 | Mathews | 248/297.3 X |
| 2,998,997 | 9/1961 | Shyne et al. | 188/205 R X |
| 3,497,037 | 2/1970 | Deibel | 188/329 |
| 4,208,798 | 6/1980 | Sampson | 188/196 R X |

FOREIGN PATENT DOCUMENTS 166348  7/1950  Fed. Rep. of Germany ...... 248/274

Primary Examiner—George E. A. Halvosa
Attorney, Agent, or Firm—H. D. Gordon

[57] ABSTRACT

An improved air chamber mounting bracket (40) for mounting an air chamber (41) to a rotary cam (32) actuated brake (10) is provided. The bracket includes a slot aperture (70) and a multiple hole aperture (72) for receiving air chamber mounting fasteners (44 and 46) for properly and positively positioning the air chamber for use with various length (54) slack adjuster levers (39). The slot aperture and the multiple hole aperture are centered about a longitudinal axis (74) for constant alignment of the air chamber in each selected mounting position thereof.

6 Claims, 2 Drawing Sheets

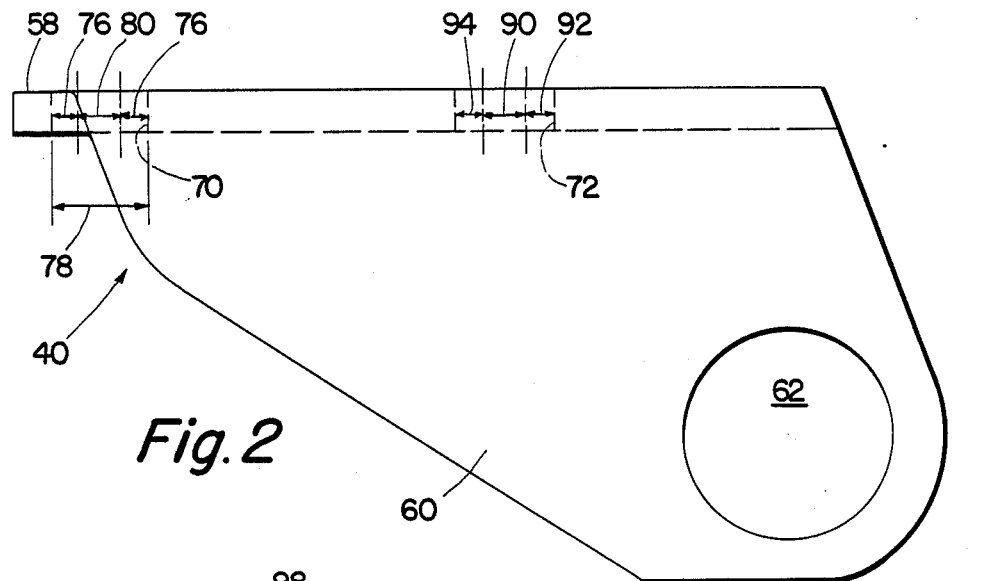
Fig. 2
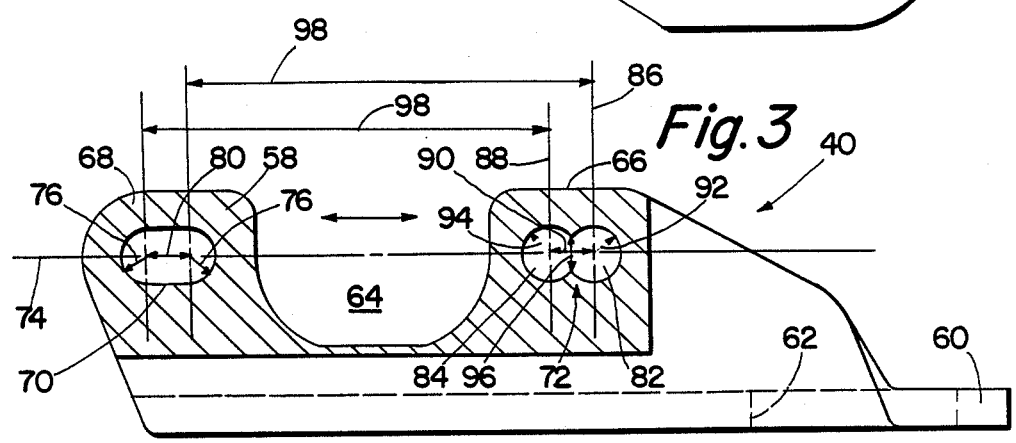
Fig. 3
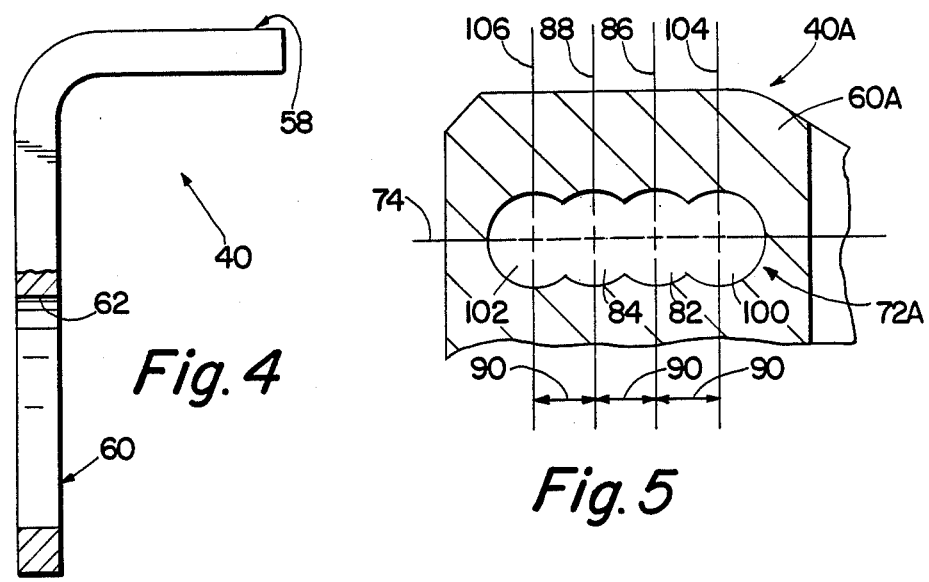
Fig. 4
Fig. 5

UNIVERSAL AIR CHAMBER MOUNTING BRACKET

BACKGROUND OF THE INVENTION

1. Field of the Invention

The present invention relates to air chamber mounting brackets and in particular to an improved air chamber mounting bracket for an air operated, cam actuated brake wherein the rotary cam is selectively rotated by an air chamber, or air motor, through a lever body, usually a slack adjuster lever body, which may be of various predetermined lengths.

2. Description of the Prior Art

Air or fluid actuated brakes wherein a rotary actuating cam, such as an "S" cam, a lead screw member or the like, is selectively rotated by a fluid motor, such as an air motor, an air chamber, or the like, through a lever body, such as the body of a slack adjuster, are well known in the prior art Examples of such brakes may be seen by reference to U.S. Pat. Nos. 3,497,037; 3,507,369 and 4,208,798 all of which are hereby incorporated by reference. It is also known that the slack adjusters, which are often supplied by a different party than the brake manufacturer and/or are often changed in the field, come in different predetermined lengths. For example, slack adjusters, which may be automatic or manual, are presently commonly commerically available in the United States in 5.0 inch, 5.5 inch, 6.0 inch and 6.5 inch lengths. The lengths are usually selected in view of torque requirements for a particular vehicle.

As the air chamber must be mounted at a particular location on the air chamber bracket for each slack adjuster length, and as the length of slack adjuster to be used in connection with a particular brake is often not known at the time of assembly of the brake, universal air chamber mounting brackets having a separate set of mounting holes for each slack adjuster length have been proposed. An example of such a universal bracket may be seen by reference to U.S. Pat. No. 260,758, hereby incorporated by reference. While such prior art universal brackets do allow for proper positioning of the air chamber for various length slack adjusters, such brackets were not totally satisfactory as a plurality of very accurately positioned sets of holes was required making the manufacture very difficult and expensive. The use of two slots has been proposed, but this has not been satisfactory as the slots do not provide a positive position for the air chamber.

SUMMARY OF THE INVENTION

In accordance with the present invention, the drawbacks of the prior art have been overcome or minimized to the extent than a relatively easily produced universal air chamber mounting bracket is provided. The above is accomplished by providing an aperture formed from aligned, often overlapping, holes having centers spaced by a distance equal to the required difference in mounting position for each slack adjuster length and an aligned slot. The overlapping holes will positively position one of the air chamber mounting bolts or studs while the slot will receive the other air chamber mounting bolts or studs. The positioning and length of the slot is not critical.

Accordingly, it is an object of the present invention to provide a new and improved universal air chamber mounting bracket which is relatively simple to produce, which positively positions the air chamber and which positions the air chamber along the same line for all adjustable positions thereof.

This and other objects and advantages of the present invention will become apparent from a reading of the detailed description of the invention taken in connection with the attached drawings.

BRIEF DESCRIPTION OF THE DRAWINGS

FIG. 2 is a front view of the bracket of the present invention.

FIG. 3 is a top view of the bracket of the present invention.

FIG. 4 is a side view of the bracket of the present invention.

FIG. 5 is a partial view of an alternate embodiment.

DESCRIPTION OF THE PREFERRED EMBODIMENT

Figure 1:
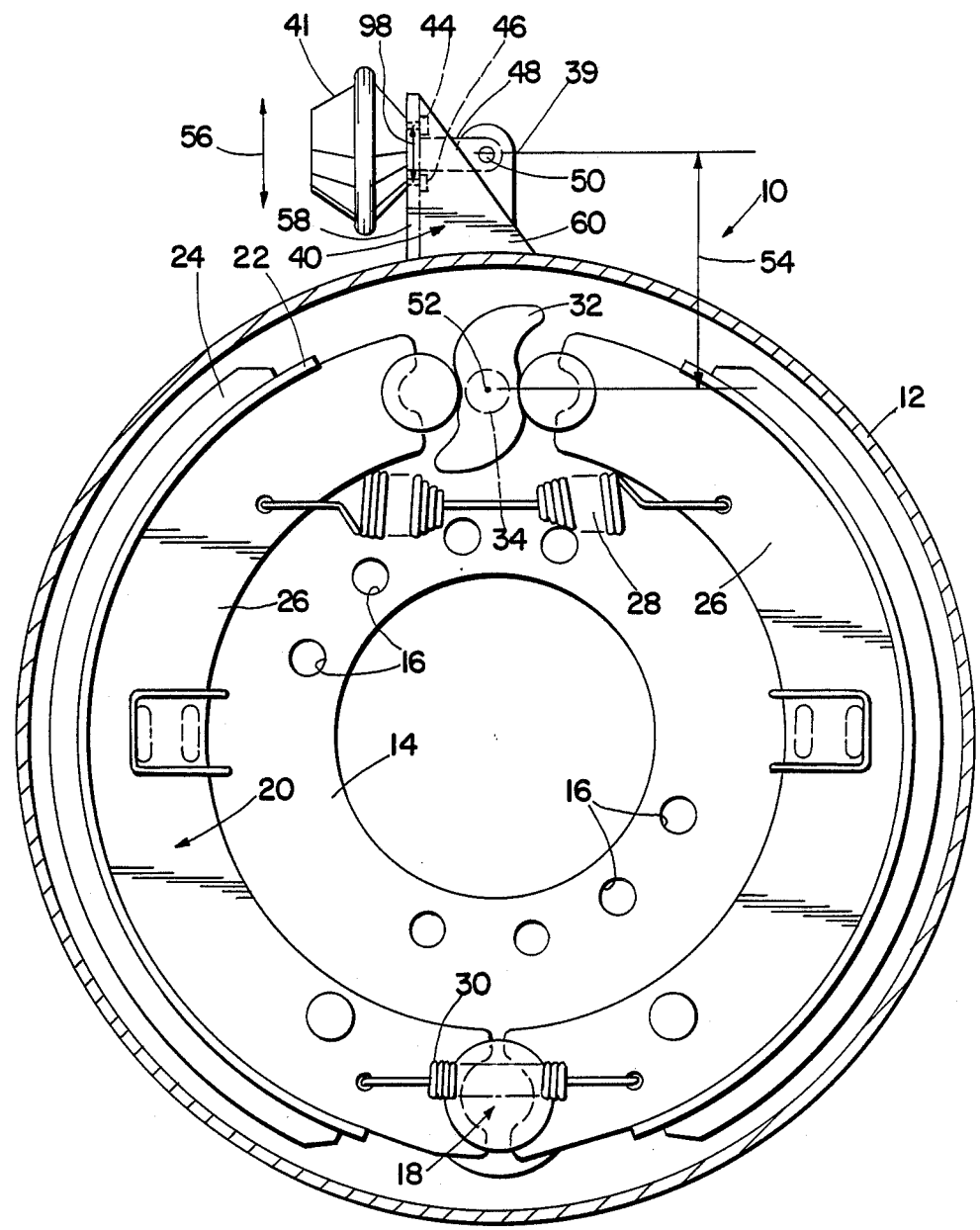
FIG. 1 is a front view of a typical air operated, cam actuated brake using the bracket of the present invention.

Certain terminology will be used in the following description for convenience in reference only and will not be limiting. The words "upwardly," "downwardly," "rightwardly," "leftwardly," "clockwise" and "counterclockwise" will designate directions in the drawings to which reference is made. The words "inwardly" and "outwardly" will refer to directions toward and away from, respectively, the geometric center of the device and designated parts thereof. The terms "inboard" and "outboard" will refer to directions toward and away from, respectively, the center of the vehicle to which the brake is mounted. Said terminology will include the words above specifically mentioned, derivatives thereof and words of similar import. The term "brake" as used herein is intended to include various frictional coupling devices such as clutches, brakes and the like.

In FIG. 1 there is shown a typical expanding shoe drum brake assembly 10. For illustrative purposes only, the drum brake assembly 10 illustrated is of the "S" cam type utilizing a single anchor pin. It is understood, however, that the present invention is equally applicable to those expanding shoe drum brake assemblies utilizing other brake actuating means, such as wedge actuators and the like, and is also equally applicable to those drum brake assemblies utilizing other types of anchor structures, such as twin anchor pins or the like. The bracket of the present invention is also applicable to other types of rotary cam actuated brakes such as air disc brakes actuated by a rotary lead screw type cam actuator.

Drum brake assembly 10 comprises a generally annular rotatable drum 12 (shown in section), a brake support member or spider 14 nonrotatably secured to portions of the vehicle by a plurality of suitable fasteners such as bolts (not shown) receivable through bolt circle holes 16, a brake shoe pivot or anchor pin 18 secured to the spider 14, a pair of opposed, generally arcuate, brake shoes 20 including a braking lining support or table 22 and a brake lining 24 of suitable friction material and webs 26, brake shoe return springs 28, brake shoe retention spring 30 and a cam element 32 for causing generally radially outwardly pivotal movement of the brake shoes 20 and brake linings 24 about the pivot or anchor pin 18 and into engagement with the brake drum 12 for braking movement of the vehicle in a known manner.

Also shown in FIG. 1, is a cam shaft 34 to which the cam 32 is nonrotationally fixed or integral therewith. The cam shaft 34 is received within a cam shaft tube (not shown) which is fixed to the spider 14. The inboard end of the cam shaft 34 is provided with splines or the like for nonrotational receipt of a lever member 39 such as the lever body of an automatic or manual slack adjuster as is well known in the art. A brake actuator support bracket, or air chamber mounting bracket, 40 is attached to the cam shaft tube for receipt of a brake actuator 41 such as an air motor, air chamber or the like. As is well known in the art, the osilliatory motion of the actuator air motor is transmitted to the cam 32 by means of the lever body of the slack adjuster and the cam shaft 34.

It is understood that the term "slack adjuster" as used herein shall refer to a lever and/or the lever body of a slack adjuster. Also, the term "air chamber" refers to known types of pressurized fluid motors and actuators as well as to analagous electrically operated devices.

The air chamber 41 is attached to the bracket 40 by means which are generally standardized in the North American trucking market and comprise two studs 44, 46, or bolts having a 0.625 inch diameter and having centeres separated by 4.75 inches.

A link 48 extends from the air chamber 41 and is pivotably attached to lever body 39 at pivot connection 50. Link 48 will variably extend from air chamber 41 to pivot lever 39 and cam 34 about their common pivot axis 52 to actuate brake 10 as is well known.

As stated previously, brakes often are used with slack adjusters various lengths, or lever arms, 54, which are measured from the pivot connection 50 to the pivot axis 52. Slack adjuster lengths 54 are usually chosen by consideraton of the torque requirments of the particular brake application and in North America the standardly commonly commerically available slack adjuster lengths are 5.0 inch, 5.5 inch, 6.0 inch and 6.5 inch (a 7.0 inch length is also occasionally utilized). In other parts of the world, various other standard lengths, usually measured in metric units, are utilized. The present invention is not limited to any particular set of standard lengths. In other parts of the world, various other standard lengths, usually measured in metric units are utilized. The present invention is not limited to any particulary set of standard lengths. To properly position air chamber 41 and link 48 for the various length slack adjusters 39, air chamber 41 must be adjustably position in the direction of arrow 56 on air chamber mounting bracket 40.

The universal air chamber mounting bracket 40 of the present invention may be seen in greater detail by reference to FIGS. 2–4.

Bracket 40 is preferably, but not necessarily, a one-piece structure comprising a face portion 58 to which the air chamber 41 is mounted and a flange portion 60 extending generally perpendicularly from the face portion. Flange portion 60 includes an aperture 62 for receipt of the cam shaft tube and about which the bracket 40 is usually welded to the cam shaft tube. The face portion 58 is provided with a cut out portion, or aperture, 64 allowing passage of link 48 in the various mounting positions of air chamber 41 on bracket 40. The above described structure is standard design for air chamber mounting brackets and well known in the prior art.

The cut out portion or aperture 64 divides face portion 58 into a lower secton 66 and an upper section 68 (as seen in FIG. 1). The illustrated bracket 40 is shown as provided with a slot aperture 70 in the upper section 48 and a multiple hole aperture 72 in the lower section 66. It is understood that slot aperture 70 could be in the lower section 66 and the multiple hole aperture 72 in the upper section 68. For simplicity of illustration, the slot 70 and multiple hole aperture structure 72 of bracket 40 is suitable for mounting air chamber 41 correctly for use with two different length slack adjusters (one being 0.5 inches longer than the other). As will be described below in connection with FIG. 5, the same principals apply for slot and multiple hole aperture structures suitable for mounting an air chamber for use with three, four or more different length slack adjusters.

Both slot aperture 70 and multiple hole aperture 72 are centered on a single longitudinal axis 74.

Slot aperture 70 has two rounded semicircular ends having a radius 76 sufficient to receive one of the bolts 44. In this example, radius 76 is about 0.33 inch to accommodate the 0.625 inch diameter bolts. The total length 78 of slot aperture 70 is two times radius 76 plus a distance 80 equal to at least the difference in length 54 of the range of different slack adjusters to be accommodated. In this example, distance 80 is at least 0.5 inch.

Multiple hole aperture 72 is also centered about longitudinal axis 74 and is of a generally figure eight shape formed by two overlapping holes 82 and 84 of sufficient size to receive bolt 46. Holes 82 and 84 are centered out transverse axes, 86 and 88, respectively, which axes are separated by a distance 90 equal to the incremental difference in length (0.5 inch in this example) between the various length slack adjusters to be accommodated. The radii, 92 and 94, of holes 82 and 84, respectively, are about 0.33 inch in this example. The transverse distance 96 between the lobes separating holes 82 and 84 is about 0.43 inch, which is less than the diameter (0.625 inch) of bolts 44 and 46 and thus a bolt 46 received in one of the holes 82 or 84 will be positively positioned therein and not subject to movement therefrom as a result of a minor loss of tension in bolt 46. Proper positioning of bolt 46 will assure that the air chamber 41 is properly located, during assembly and use of brake assembly 10, to obtain the correct geometry of link 48 relative to surface 41 and the lever 49.

Distance 96 is calculated by the relationship of $c^2 = a^2 + b^2$ where $c = 0.33$ inch (radii 92 or 94), $a = 0.25$ inch (one half of 90) and b = one half of 96.

The use of a multiple hole structure similar to 72, illustrated in FIGS. 2–4 will be acceptable in situations wherein the square of the radius of the bolts 44 or 46 is greater than $c^2 - a^2$ where "c" is the radius of the holes (82 or 84) in which the bolt is to be retained and "a" is one half the incremental difference between slack adjuster lengths to be accommodated (i.e. (bolt radius)$^2$ is greater than (hole radius)$^2$ − (incremental slack adjuster length difference /2)$^2$). It is recognized that the intersections 96A of the periphery of holes 82 and 84 may be somewhat rounded for production purposes. In such situations, the distance 96 will be somewhat greater than twice the square root of $c^2 - a^2$. Such situations are acceptable providing the square of the radius of the bolts 44 or 46 is greater than $(c^2 - a^2)$ plus the thickness of material removed at 96A for production material. In the usual situation, the thickness of material removed at 96A is negligible and for purposes of this description and the attached claims may be considered to be included in the value of the square root of $c^2 - a^2$.

It is recognized that the intersections 96A of the periphery of holes 82 and 84 may be somewhat rounded for production purposes. In such situations, the distance 96 will be somewhat greater than twice the square root of $c^2-a^2$. Such situations are acceptable providing the square of the radius of bolts 44 or 46 is greater than $(c^2-a^2)$+the thickness of material removed at 96A for production purposes. In the usual situation, the thickness of material removed at 96A is functionally negligable and for puroses of this description and the attached claims may be considered to be included in the value of the square root of $c^2-a^2$.

Of course, holes 82 and 84 of multiple hole aperture 72 need not overlap or may overlap greater than illustrated provided the $b^2$ is greater than $c^2-a^2$ relationship is maintained.

As mentioned previously, studs 44 and 46 on air chamber 41, or threaded holes in air chamber 41 to receive bolts 44 and 46, are separated by about 4.75 in standardly used North American air chambers. This predetermined bolt separation 98 defines the separation along longitudinal axis 74 from either transverse axis 86 or 88 to a point within slot aperture 70 which will receive bolt 44. As may be seen, so long as the points in slot 70 along longitudinal axis 74 and separated from axis 86 or axis 88 by distance 98 will receive bolt 44, the exact positioning and shape and length of slot 70 is not critical. In the preferred embodiment, slot 70 should be designed with adequate clearance to bolts 44 and 46 to assure that positioning of the air chamber 41 is controlled by multiple hole aperture 72.

A slightly modified alternative embodiment 40A of bracket 40 described above may be seen by reference to FIG. 5. In FIG. 5, a face portion 60A having a modified multiple hole aperture 72A is illustrated. Modified multiple hole aperture 72A is similar to aperture 72 described above except it is formed from four holes 100, 82, 84 and 102 centered about longitudinal axis 74. The transverse axes 104, 86, 88 and 106 of the holes 100, 82, 84 and 102, respectively, are separated from the nearest axis by a distance 90 generally equal to the incremental difference in length between the slack adjusters to be accommodated. A slot (not shown) similar to slot 70 but having a length equal to at least two times radius 76 plus three times 90 will also be provided.

The bracket 40A of FIG. 5 is functionally identical to bracket 40 except it will allow proper positioning of air chamber 41 for four, different length slack adjusters.

It may be seen that the universal air chamber mounting bracket (40 or 40A) of the present invention provides a relatively simple structure allowing an air chamber 41 to be positively and correctly positioned, along a single optimal transverse axis, 74, for use with various length slack adjusters or levers and that the correct positioning does not require maintaining a high tension in the fastening bolts.

Although this invention has been described in its preferred form with a certain degree of particularity, it is understood that the present disclosure of the preferred form has been made only by way of example only and that numerous changes in the details of construction and combination and arrangement of the parts may be resorted to without departing from the spirit and the scope of the invention as hereinafter claimed.

I claim:

1. An improved air chamber mounting bracket for mounting an air chamber to an air operated rotary cam actuated brake assembly of the type including a lever pivotably mounted at one end to a link usually extendable from the air chamber and at the other end thereof in rotary driving connection to said cam, said lever being of one of a known plurality of lengths, said air chamber mountable to said bracket at one of a plurality of selectable mounting locations correctly positioning said air chamber for each selected lever length by two spaced apart threaded fasteners having a known radius and a known separation, said improved bracket comprising:

a flange portion mountable to the brake assembly and, a mounting face portion extending generally perpendicularly to said flange portion, said face portion divided into a first and a second section by a link opening allowing passage of said link for all of the selectable mounting locations of said air chamber, said first section having an elongated slot therethrough capable of receiving one of said threaded fasteners and centered about a longitudinal axis, said slot having a length measured along said longitudinal axis at least as great as twice the radius of said threaded fasteners plus the difference in length between the longest and shortest length lever, said second section having a multiple hole aperture therethrough defined by a number of generally annular holes equal to the number of selectable lengths of levers, each of said holes having a radius greater than the radius of said threaded fasteners and being centered about said longitudinal axis, each of said holes being centered about a different transverse axis spaced from the adjacent transverse axis along the longitudinal axis by a distance equal to the incremental difference in length of the closest in length selectable different length levers, each of said transverse axes spaced from a point within said slot capable of receiving one of said threaded fasteners by a distance equal to said known separation between said two threaded fasteners.

2. The improved bracket of claim 1, wherein said bracket is a one-piece structure.

3. The improved bracket of claim 2, wherein said holes overlap.

4. The improved bracket of claim 3, wherein the incremental difference in length of closest in length selectable levers is equal and $b^2$ is greater than $c^2-a^2$ where:

b=the radius of the threaded fasteners, a=the incremental difference in length between closest in length selectable lever, and c=the radius of the holes.

5. The improved bracket of claims 1 or 3, wherein:

$b^2$ is greater than $c^2-a^2$ where:

b is the radius of the threaded fasteners, a is one-half of the largest incremental difference in length between closest in length selectable levers, and c is the radius of the holes.

6. The improved bracket of claims 1 or 5, wherein said lever comprises a slack adjuster body.

* * * * *